May 31, 1927.
W. I. CLEMENTS
1,631,010
COMBINED GLARE, WIND, RAIN, AND INSECT SHIELD FOR AUTOMOBILES
Filed March 2, 1926    2 Sheets-Sheet 1
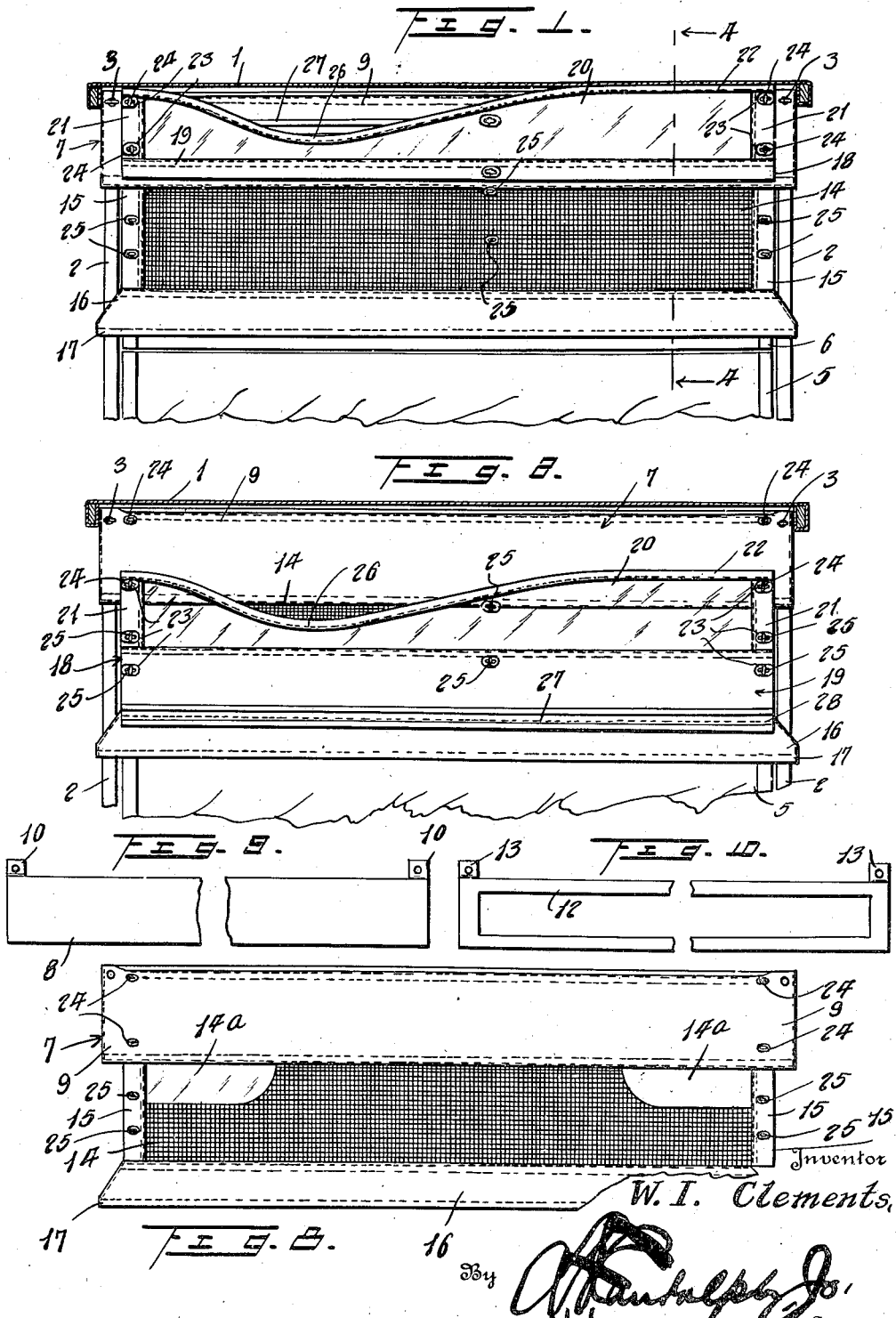

May 31, 1927.  
W. I. CLEMENTS  
1,631,010  
COMBINED GLARE, WIND, RAIN, AND INSECT SHIELD FOR AUTOMOBILES  
Filed March 2, 1926  
2 Sheets-Sheet 2
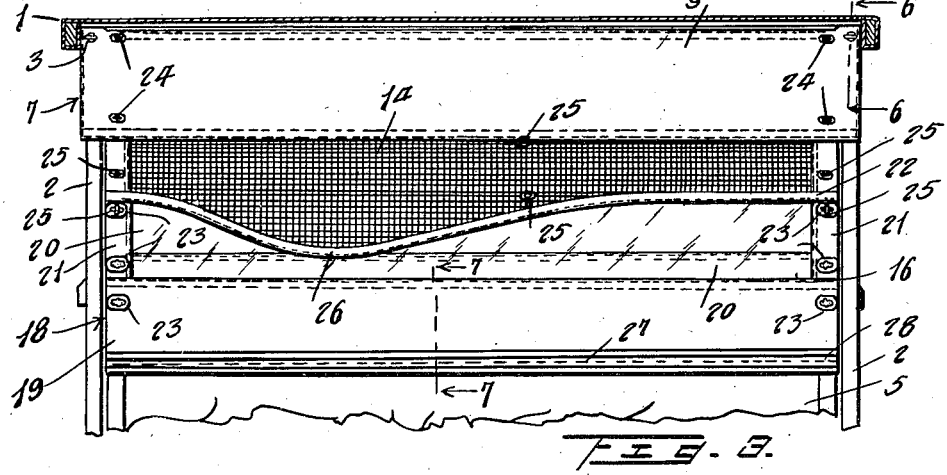
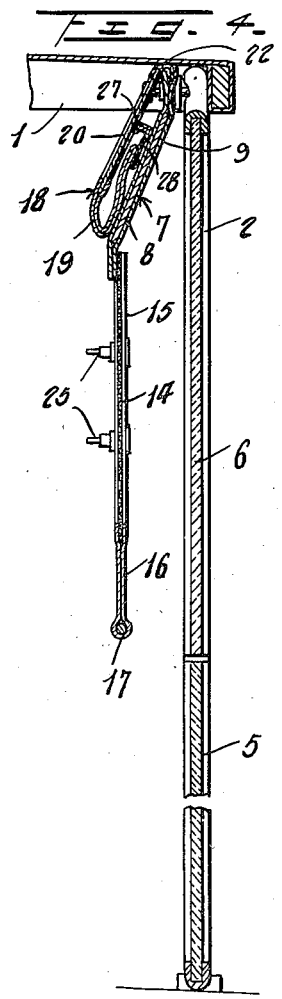
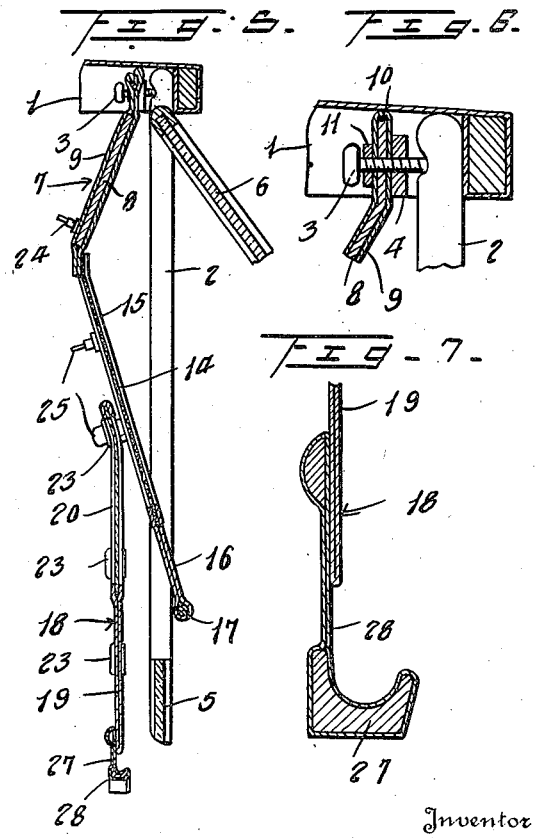
Inventor  
W. I. Clements Patented May 31, 1927.

1,631,010

UNITED STATES PATENT OFFICE.

WELLINGTON I. CLEMENTS, OF NORFOLK, VIRGINIA.

COMBINED GLARE, WIND, RAIN, AND INSECT SHIELD FOR AUTOMOBILES.

Application filed March 2, 1926. Serial No. 91,742.

This invention relates to a combined glare, wind, rain and insect shield for automobiles, and has for one of its objects to provide a device of this character embodying an opaque panel which shall be adapted to occupy a downwardly and rearwardly inclined position at the rear side of the windshield of the automobile to protect the eyes of the driver from the glare of the sun and from blinding headlights, and when driving with the windshield opened to direct the wind downwardly away from his face and in the direction of his body so as to protect his forehead and eyes from the wind and enable him to drive in comfort without his hat.

A further object of the invention is the provision of a device of the character stated wherein the panel may be secured to an automobile of touring type by the bolts through the medium of which the top is secured to the windshield supporting posts, or to the front corner posts of an automobile of the closed type by means of two screws or bolts.

A further object of the invention is the provision of a device of the character set forth embodying a second or transparent and reticulated panel which shall be carried by the first panel and adapted to occupy a folded position against the front or rear side thereof when not in use and which when in use shall be adapted to occupy a depending position with respect to the first panel so as to protect the eyes of the driver from road glare when driving with the windshield closed and from road glare, dust, insects and the full force of the wind when driving with the windshield opened.

A further object of the invention is the provision of a device of the character set forth wherein the second panel shall be adapted to be arranged in a vertically depending position when driving with the windshield opened to afford the protection stated and direct the greater portion of the wind downwardly into the front compartment or portion of the automobile.

A further object of the invention is the provision of a device of the character set forth wherein the second panel shall be adapted to be arranged in a downwardly and forwardly inclined position when driving with the windshield opened to afford the protection stated and permit the wind to enter the automobile without downward deflection.

A further object of the invention is the provision of a device of the character stated which shall embody a third panel having an opaque lower and a transparent and imperforate upper portion which shall be adapted to be supported by the first panel in a folded position against the rear side thereof so as to provide a pocket for the reception of maps, cigars, cigarettes and the like.

A further object of the invention is the provision of a device of the character stated wherein the third panel shall be adapted to be supported by the first panel in a depending position in rear of the second panel for the purpose of keeping out hard rains and strong head winds when driving with the windshield opened.

A further object of the invention is the provision of a device of the character set forth wherein the third panel shall be adapted to be detached from the first panel and secured to the second panel with its transparent portion occupying a position in rear of the lower portion of the second panel for the purpose of affording protection from light rains and to permit of the effective ventilation of the automobile when driving with the windshield opened.

A further object of the invention is the provision of a device of the character set forth wherein the third panel shall be adapted, when secured in said position to the second panel and with the second panel in its forwardly and downwardly inclined position, to afford the protection stated and at the same time provide for the proper ventilation of the lower portion of the front compartment of the automobile when driving with the windshield opened.

A still further object of the invention is the provision of a device of the character set forth wherein the third panel shall be provided with a gutter adapted to direct the water impinging against the front side thereof to the right hand side of the automobile and away from the driver and the occupants of the front seat when driving with the windshield opened.

With the foregoing and other objects in view, the invention consists of the novel construction, combination and arrangement of parts hereinafter fully described and claimed, and illustrated in the accompanying drawings wherein:

Figure 1 is a view partly in vertical section and partly in rear elevation illustrating the device applied to an automobile of the open or touring type, the second panel being shown in position for use and the third panel in folded position at the rear side of the first panel, Figure 2 is a view similar to Figure 1 showing the third panel in one of its positions for use, Figure 3 is a view similar to Figures 1 and 2 showing the third panel in another utile position, Figure 4 is a vertical sectional view taken on the plane indicated by the line 4—4 of Figure 1, Figure 5 is a similar view illustrating the second panel in another position, Figure 6 is a detail sectional view taken on the vertical plane indicated by the line 6—6 of Figure 3, Figure 7 is a detail sectional view taken on the vertical plane indicated by the line 7—7 of Figure 3, Figure 8 is a detail plan view of the first and second panels, Figure 9 is a detail plan view of the plate constituting a part of the first panel, and Figure 10 is a detail plan view of the frame that may be used in place of the plate.

Corresponding and like parts are referred to in the following description, and designated in the several views of the accompanying drawings, by similar reference characters.

In the drawings, 1 designates the top and 2 the windshield supporting posts of an automobile of the open or touring type. The top 1 is secured to the posts 2 by bolts 3 which have threaded engagement with brackets 4 secured to the top and engage the posts. While the windshield is shown as embodying pivoted lower and upper sections 5 and 6, it may be any of the many well known types now in use.

The device forming the subject-matter of this invention comprises an opaque panel 7 which is slightly longer than the windshield and adapted to occupy a downwardly and rearwardly inclined position at the upper rear side thereof. The upper edge of the panel 7 is arranged in close proximity to the top 1 so as to prevent the passage of wind over said edge thereof. This panel is of oblong rectangular formation and is adapted to protect the eyes of the driver from the glare of the sun and from blinding headlights. It is also adapted, when driving with the windshield opened, to direct the wind downwardly away from the face of the driver and in the direction of his body so as to protect his forehead and eyes from the wind and enable him to drive in comfort without his hat. The panel comprises a metal plate 8 and a covering 9 therefor of leather, imitation leather or other suitable material. The plate 8 is provided at its upper corners with apertured lugs 10 to permit the panel to be secured in place by the bolts 3. The lugs 10 contact with the rear sides of the brackets 4, and nuts 11 mounted on the bolts 3 contact with the rear sides of the lugs which are arranged at an angle to the plate 8 so as to support the panel in its downwardly and rearwardly inclined position. The lugs 10 permit the panel to be secured to the front corner posts of an automobile of the closed type by means of two screws or bolts. If desired, a metal frame 12 may be used in place of the metal plate 8, and the forme is provided at its upper corners with attaching lugs 13 which are arranged at an angle to the plane thereof.

A transparent and reticulated panel 14, which is also of elongated rectangular formation and preferably made of wire cloth, has one of its longitudinal edges secured to the lower edge of the panel 7. The length of the panel 14 is less than that of the panel 7 and less than the distance between the posts 2. Flexible binding strips 15 are secured over the end or lateral edges of the panel 14, and a flexible binding strip 16 is secured over and depends from the lower edge of the panel. A rod 17 is secured within the binding strip 16 at the lower edge thereof, and said rod and edge of the binding strip are longer than the panel 14 and the distance between the posts 2. The panel 14 is adapted to occupy a folded position against the front or rear side of the panel 7 when not in use, and when in use is adapted to occupy a depending position with respect to the panel 7 so as to protect the eyes of the driver from road glare when driving with the windshield closed and from road glare, dust, insects and the full force of the wind when driving with the windshield opened. The panel 14 is adapted to be arranged in a vertically depending position with respect to the panel 7 when driving with the windshield opened to afford the protection stated and direct the greater portion of the wind downwardly into the front compartment of the automobile, as shown in Figure 4. This panel is also adapted to be arranged in a downwardly and forwardly inclined position with respect to the panel 7 when driving with the windshield opened, as shown in Figure 5, and when in this position affords the protection stated and permits the wind to enter the automobile without downward deflection. The panel 14 is adapted to be supported in this position by the rod 17 and posts 2, and when it is desired to support the panel in this position the rod is positioned for contact with the front sides of the posts, as shown in Figure 5. To afford additional protection for the eyes of the driver and other occupants of the front seat of the automobile against the sun, road glare and headlights, strips 14ᵃ of suitably colored celluloid or the like are secured to the panel 14 at the upper corners thereof.

A panel 18 having an opaque portion 19 and a transparent portion 20, is detachably secured to the panel 7 with its transparent portion rearmost in order to provide a pocket for the reception of maps, cigars, cigarettes and the like. The portion 19 may be made of leather, imitation leather or other suitable flexible material, and the portion 20 is preferably made of celluloid and is provided at its ends or lateral edges with flexible binding strips 21 and at its free longitudinal edge with a flexible binding strip 22. The panel 18 is provided with metal eyes 23 for the reception of fastenings 24 carried by the panel 7 and projecting from the rear side thereof. The fastenings 24 detachably connect the panel 18 to the panel 7 and are preferably of the turn button or rotatable locking head type. Similar fastenings 25 are secured to the panel 14 which together with the fastenings 24 permit the panel 18 to be supported in rear of the panel 14 in the manner shown in Figure 2. When in this position, the panel 18 functions to protect the driver from hard rains and strong head winds when driving with the windshield opened. The upper edge of the panel 18 is curved downwardly as shown at 26. This curved or recessed portion of the panel 18 is located to the left of the vertical center of the panel and permits the driver to clearly see the roadway through the panel 14. The fastenings 25 permit the panel 18 to be attached to the panel 14 in the manner shown in Figure 3, and when the panel 18 is in this position the greater portion of the panel 14 is visible above the upper edge of the panel 18. With the panel 18 in this position and the panel 14 in a vertical position with respect to the panel 7, the device affords protection from light rays when driving with the windshield opened and permits the effective ventilation of the automobile. With the panel 18 in this position, the panel 14 may be arranged in a downwardly and forwardly inclined position with respect to the panel 7, and the device will afford protection against rain and insure the proper ventilation of the automobile when driving with the windshield opened. If desired, the panel 18 may be supported in any one of said positions on the panel 14 with its upper edge inclining downwardly from left to right should it be found necessary to do so in order to give the driver a clearer view of the right hand side of the roadway especially at crossings. A trough 27 is secured to the lower edge of the panel 18 and is adapted to convey to a side of the automobile water impinging against the panel when driving in the rain with the windshield opened.

From the foregoing description, taken in connection with the accompanying drawings, the advantages of the construction and of the uses to which the device may be put will be readily apparent to those skilled in the art to which it appertains. While I have described the principle of the invention, together with the device which I now consider to be the best embodiment thereof, I desire to have it understood that the device shown is merely illustrative, and that such changes may be made when desired as are within the scope of the invention as claimed.

What is claimed is:—

1. A shield for an automobile comprising an imperforate panel, means adapted to secure the panel to the automobile in a downwardly and rearwardly inclined position at the rear side of the windshield, a second panel secured to and depending from the first panel, said second panel being perforated and adapted when not in use to be folded against the first panel, and means for securing the second panel in folded position against the first panel.

2. A shield for an automobile comprising a panel, means adapted to secure the panel to the automobile in a downwardly and rearwardly inclined position at the rear side of the windshield, a second panel secured to and depending from the first panel and being perforated, and means adapted to support the second panel in a downwardly and forwardly inclined position with respect to the first panel.

3. A shield for an automobile comprising an imperforate panel, means adapted to secure the panel to the automobile in rear of the windshield, a reticulated panel secured to and depending from the first named panel, and means adapted to support the reticulated panel in a downwardly and forwardly inclined position with respect to the first named panel.

4. A shield for an automobile comprising a panel, a reticulated panel secured to the first named panel, a panel having a transparent portion, and means adapted to secure the last named panel to one or the other of said first and second named panels.

5. A shield for an automobile comprising a panel, means adapted to secure the panel to the automobile in rear of the windshield, a second and reticulated panel secured to the first panel, a third panel having a transparent portion and a trough, and means adapted to secure the third panel to one of said first and second panels.

6. A shield for an automobile comprising a panel, means adapted to secure the panel to the automobile in rear of the windshield, a second and reticulated panel secured to the first panel, a third panel having transparent and opaque portions, means adapted to secure the third panel in folded position to the first panel, and means adapted to secure the third panel in extended position to the second panel.

7. A shield for an automobile comprising an upper panel secured to the automobile in rear of the windshield, a lower reticulated panel secured to and depending from the upper panel, and a third panel secured to the reticulated panel and provided with a trough.

8. A shield for an automobile comprising upper and lower panels extending across the front of the automobile, the upper panel being inclined downwardly and rearwardly and the lower panel being reticulated and said panels being free of connection with the windshield to permit the latter to be opened without altering the position of the first panel.

9. A shield for an automobile comprising an upper imperforate panel, means adapted to secure the panel to the automobile, a lower reticulated panel adapted to be arranged in a forwardly inclined position and in a vertical position, and means for releasably securing the lower panel in said inclined position.

10. A shield for an automobile comprising, in combination with a windshield and the supports therefor, an upper panel, means adapted to secure the panel to the automobile free of connection with the windshield, a lower panel adapted to be arranged in a forwardly inclined position and in a vertical position, and means connected to the lower panel and releasably connected to the supports to secure this panel in said inclined position.

11. A shield for an automobile comprising, in combination with a windshield and the supports therefor, an upper imperforate panel, means securing the panel to the automobile free of connection with the windshield, a lower reticulated panel adapted to be arranged in a forwardly inclined position and in a vertical position, and means connected to the lower panel and releasably connected to the supports to secure this panel in said inclined position.

12. A shield for an automobile including a reticulated panel, means adapted to secure the panel to the automobile, an imperforate panel, and means by which the second panel may be secured to and across the first panel with the upper edge of the second panel at different distances from the corresponding edge of the first panel.

13. A shield for an automobile including a reticulated panel, means adapted to secure the panel to the automobile, an imperforate panel having a curved upper edge, and means for adjustably securing the second panel to and across the first panel.

14. In combination, the top and windshield of an automobile, an opaque panel extending across the automobile in rearwardly spaced relation to the upper portion of the windshield and having its upper edge arranged in close proximity to the top, the panel being adapted to protect the driver's eyes from light rays and cooperating with the top to protect his head and eyes from the wind when driving with the windshield open, and a reticulated panel depending from the opaque panel and adapted to protect the eyes of the driver from road glare and also adapted to protect them from dust, insects and rain when driving with the windshield open.

In testimony whereof I affix my signature.

WELLINGTON I. CLEMENTS.